3,073,270
BRAZING PASTES
Paul D. Johnson and Thomas E. Popin, Gary, and Jacob O. Koers, Hammond, Ind., assignors to The Glidden Company, Cleveland, Ohio, a corporation of Ohio
No Drawing. Filed Dec. 5, 1960, Ser. No. 73,507
20 Claims. (Cl. 113—110)

This invention concerns the preparation of novel brazing and other joining-type paste compositions of improved physical and chemical characteristics. The invention is particularly concerned with improvements in joining-type paste compositions for commercial use, which paste compositions permit the joining of metals by the employment of techniques currently known to the industry. One aspect of this invention is specifically applicable to furnace brazing operations and to non-spreading (under furnace heat conditions), anti-flashing gel-type emulsion brazing paste compositions therefor, although the compositions of this invention in their broader application are appropriate for joining operations such as induction heating and torch operations known to the metal joining art.

This application is a continuation in part of application Serial No. 827,141, filed July 15, 1959, and now abandoned.

In the furnace brazing art, the term "furnace brazing" refers to a furnacing process in which an assembly of close-fitting parts is heated in a reducing or protective atmosphere to temperatures slightly above the melting point of the brazing metal, e.g. copper powder, but below the melting point of the parent metal to be joined. Joining pastes of the nature of copper powder or copper oxide pastes, copper-phosphorus pastes or the like are positioned in or around the joints to be joined before the assembly is put in the furnace. When the assembly reaches or slightly surpasses the melting point of the joining metal, the latter melts and is drawn by capillary action into the close-fitting joint. When high temperatures are involved in the joining operation (as distinguished from the low temperatures of soft-soldering,) alloying at the joint interface occurs due to the diffusing and solvent effect of the molten joining metal on the parent metal. Furnace brazing temperatures, as noted, are below the melting point of the parent metal, but usually greater than 800° F., for example from 1100° to 2000° F. or higher.

In general, joining pastes comprise two or more fundamental components: (1) a powdery joining-metal component in the range of from 60 to 90 percent, (2) a vehicle therefor in the range of from 10 to 40 percent, and (3) a flux, if necessary, in the range of from 0 to 20 percent. Because of the temperatures employed in furnace-brazing and other joining operations, the vehicle must possess certain physical properties in order to assist the joining-metal component in making a sound joint. Brazing pastes illustrating these basic formulations have heretofore been described in U.S. Patents 2,594,313, 2,566,339, 2,606,132 and 2,908,072. The teachings of these patents are incorporated herein by reference.

The primary function of the vehicle in joining pastes is to provide a simple placement medium for the joining-metal component. Fluxes are essential in certain operations in furnace brazing techniques, particularly in connection with strongly electro-positive metals such as aluminum.

Some of the requirements for a good paste are that it be a soft, essentially non-settling, non-drying and moderately fluid material. These properties are important in connection with mechanical paste applicators where flow may be restored even though paste is left in the applicator or applicator system during extended shutdowns.

Since pastes were developed as a substitute for solid shapes, spreading of the paste from its original applied position should not occur during volatilization and dissipation of the vehicle when heat is applied to form the intended joint. That is, such spreading away from the joint site not only represents a waste of joining metal but also can result in scrapping the finished assembly because joining metal has migrated to areas where it is not wanted. This anti-spreading characteristic also entails anti-flashing characteristics both of which depend primarily upon vehicle formulation. If formulation is not carefully controlled, flashing (i.e. spattering) under heat (like butter in a frying pan) causes finely divided joining metal constitutents to be projected over a large expanse of the parts. The joining metal particles so projected to remote areas are of course useless in effecting a joint in the primary location.

In the paste compositions prepared in accordance with the teachings of the above patents we have found it to be difficult, and at most times impossible to formulate a product which does not spread and spatter perceptibly under furnace or like heating. These shortcomings are especially acute with a paste composition in which cuprous oxide is carried in a petroleum type vehicle. We have now developed improved pastes which overcome these undesirable characteristics of the prior art compositions.

Accordingly it is an object of our invention to provide an essentially non-drying, non-settling emulsion paste composition, which composition is sufficiently fluid to enable it to be dispensed through an air-pressure or other mechanical-type applicator while yet exhibiting desired resistance to spreading and spattering.

A further object of the invention is to provide an emulsion paste composition which adheres to horizontal and inclined surfaces without spreading under furnace heat.

A still further object of this invention is to provide emulsion paste compositions of minimum flashing tendency, such paste compositions being essentially non-drying in air and being stable non-settling gelled emulsions.

In accordance with the objects of our invention we provide emulsion paste compositions comprising powdery joining metal components dispersed in an emulsion vehicle comprising a continuous aqueous phase, an emulsified hydrocarbon component as an internal phase, a small amount of hydroxyethyl cellulose, and a water-soluble gelling component dissolved in the continuous aqueous phase.

In general, our joining paste compositions consist essentially of from 70 to 85 percent of a powdery joining-metal component and 15 to 30 percent of said emulsion vehicle with or without optional materials such as fluxes, oxidizing agents, corrosion inhibitors, wetting agents, etc. The joining metal component of the compositions of our invention can be composed of any of the usual materials such as copper powder, copper oxide, a combination of both, combinations of copper and phosphorus-copper powders or silver powder, lead and tin powder mixtures, the latter to provide a soft solder alloy powder, zinc and tin powder mixtures for joining aluminum, etc. In general therefore, and as taught in the patents referred to above as well as others, the joining metal component can be composed of bonding metal and/or alloy powders, metal oxides which under the conditions of temperature and/or atmosphere prevailing during the joining operation are capable of yielding desired joining metal(s), or mixtures of such oxides with metal powder(s) and/or powdered alloy(s). Subsequent examples will illustrate the use of such powdery components in our emulsion paste compositions.

THE VEHICLE

The vehicles of our pastes are oil-in-water type emulsions which have been formulated to exhibit gel characteristics. The continuous water- or aqueous-phase of the emulsions comprises a water solution of water-soluble organic alcohols in which solution has been dissolved a small amount of hydroxyethyl cellulose. When formulated within the limits expressed below, this three-component aqueous phase yields a stable, anti-spreading, anti-spattering gel when a hydrocarbon component is emulsified therein as the internal phase by means of any suitable non-ionic emulsifiers. The resulting emulsion gel is sufficiently stiff to carry the joining metal component therein in a time-stable, non-settling condition, provided the vehicle is formulated within the limits set forth below, exclusive of optional additives discussed hereinafter.

*Vehicle Formulation*

| | Percent by wt. |
|---|---|
| Water | 14.8–45.0 |
| Water-soluble alcohol(s) | 79.2–45.0 |
| Hydrocarbon component | 5.0–17.7 |
| Hydroxyethyl cellulose [1] | 0.5– 5.4 |
| Emulsifying agent | 0.3– 3.0 |

[1] Amount varies with the viscosity grade selected for use.

THE WATER-SOLUBLE ALCOHOL(S)

The water-soluble alcohols are mainly polyhydric alcohols such as alkylene glycols of 2–8 carbons (e.g. ethylene glycol, propylene glycol, butylene glycol, octylene glycol, etc.) polyoxyalkylene glycols of 4–8 carbons (e.g. diethylene glycol, triethylene glycol, dipropylene glycol or dibutylene glycol), ethanol amines of 2–6 carbons (e.g. ethanol amine, diethanol amine, or triethanol amine), or hydrocarbyl polyols of 3–6 carbons, such as glycerine, pentaerythritol, sorbitol, trimethylol propane and trimethylol ethane. However, mixtures of the foregoing alcohols with minor amounts (i.e. up to about 30% by weight) of branched chain alkanols of 3–6 carbons can also be used effectively. Examples of said alkanols are isopropanol, isobutanol, isopentanol and isohexanol. We prefer, however, to use the alkylene and/or oxyalkylene glycols to the exclusion of the other named alcohols, mainly because they decompose quietly at brazing temperatures into hydrogen and carbon monoxide. Amounts between about 58% and 76%, by weight of the vehicle, are preferred.

THE HYDROCARBON COMPONENT

This component of our vehicles is a normally-liquid hydrocarbon compound or solution having a low Conradson residue; that is, it is composed of hydrocarbons which either volatilize and/or heat-depolymerize at the temperatures of the Conradson residue test to leave less than about 0.5% of residue, preferably less than 0.1% of residue. It will be understood that the residue in usually composed mostly of carbon, but as the term "residue" is here used we mean carbon and any other solid matter deposited in a simulated Conradson test carried out on the hydrocarbon component.

Typical liquid hydrocarbon materials encompassed within our foregoing description are gasoline, kerosene, light mineral oils, hydrocarbon solvent solutions of petroleum jelly or of the hydrocarbon polymeric gels of the heat-depolymerizable kinds disclosed in U.S. Patent No. 2,566,339, and the 6–44% polybutene/mineral oil solutions disclosed in U.S. Patent No. 2,908,072. While these patents, and the others identified earlier herein, have disclosed the use of heat-depolymerizable hydrocarbons or their solutions as carriers or vehicles of joining-metal pastes, and have alluded to their merits in conferring desirable qualities to the performance of the joining-metal component in forming sound joints, we do not here use the hydrocarbon component of our vehicle primarily for those ascribed qualities. Instead, we have discovered that the presence of an emulsified, discontinuous hydrocarbon phase in our aqueous-phase vehicles is needed to develop the herein desired freedom from spreading and spattering. It is not presently clear how this hydrocarbon discontinuous phase assists in securing the aforesaid qualities but it has been established by our tests that our vehicles do not exhibit the desired qualities when the hydrocarbon component is omitted.

Of the various useful hydrocarbon materials mentioned above, we presently prefer the 6–44% polybutene solutions, and prefer to use them in amounts between about 5.0% and 17.7% by weight of the vehicle.

The butene heat-depolymerizable polymers of our invention are adequately described in U.S. Patent 2,908,072 and are characterized by their low Conradson residue values. As noted in said patent these butene polymers can be prepared so as to have moderately high molecular weights, thereby giving products of heavy body. The body or viscosity can range widely for our joining paste usage since the viscosity is not a factor of any moment in our pastes. Polybutenes of the kind described above are available commercially in the form of 6 to 44 percent solutions containing polybutene dissolved in mineral base lubricating oil(s). These solutions contain small amounts of non-polybutene products which do not impair the usefulness of the commercial solutions, e.g. small amounts of aromatic condensates and/or ester type metal wetting and lubricity agents. The commercial solutions and equivalent hydrocarbon-solvent solutions of polybutenes described above have Conradson values of usually less than 0.1 percent so that they leave practically no carbon deposits on articles brazed or joined in conventional ways by use of torch, induction heating, or controlled-atmosphere brazing furnaces. The commercially-available polybutenes distributed under trademarks Caloria 40M, 50 and 150 have the following specifications:

| Property | Caloria 40-M | Caloria 50 | Caloria 150 |
|---|---|---|---|
| Gravity—API | 38.5 | 39.6 | 39.0. |
| Color—Rob | 24½ | 25+ | |
| Flash—Open cup | 150° F | 260° F | 260° F. |
| Fire | 165° F | 285° F | 280° F. |
| Pour | +30° F | +20° F | +25° F. |
| Visc. SUS at 100° F | 189,000 | 101 | 499. |
| Visc. SUS at 210° F | 40,000 | 50 | 149. |
| Polybutene | About 39% | About 6% | About 8%. |
| Volatile light petroleum | About 56% | About 90% | About 90%. |
| Liquid organic ester | | | |
| Aromatic hydrocarbon condensate | {5% | 3.8% | {.5%, 1.5%. |
| Viscosities (Gardner-Holdt, 25° C.) | Z6+ | A– | D+. |
| Conradson value | .008% | .0036% | .005%. |

1. Infrared spectrum identical with National Bureau of Standards Card 248 (Plasticizer Grade).

THE HYDROXYETHYL CELLULOSE

Since our brazing paste compositions employ less oil content (that is, less hydrocarbon component) and a greater amount of alcohol than prior art compositions we found it difficult to hold the joining-metal powder(s) in suspension without making a further modification. This modification entails the addition of small amounts of hydroxyethyl cellulose to gel the aqueous phase of the vehicle and entails the use of water-soluble alcohols having a plasticizing effect on the hydroxyethyl cellulose.

When so gelled, the aqueous phase of our present vehicle compositions can contain as much as 45% of water and 45–79.2% of water-soluble alcohol. To confer the desired anti-spreading and anti-spattering qualities to such a gelled phase we found that only small amounts of hydrocarbon component are needed, provided the latter is emulsified with the gelled aqueous phase.

The hydroxyethyl cellulose is a water-soluble ether of cellulose and can be prepared by the reaction between ethylene oxide and alkali cellulose. In the manufacture of cellulose derivatives it is known for example that the degree of substitution, that is, the quantity of substituent groups introduced into the cellulose molecule may be varied, thus changing the solubility of the product. Therefore, for the most advantageous practice of this invention there should be a sufficient number of substituent groups present in the cellulose to render the product water soluble. In the case of hydroxyethyl cellulose, those skilled in the art (see U.S. Patent 2,881,771) will recognize that the average degree of substitution should be at least about three hydroxyethyl ($-CH_2CH_2OH$) groups for every ten anhydroglucose units. An example of a hydroxyethyl cellulose composition, appropriate for the practice of this invention, is the trademarked product "Cellosize," available commercially in various viscosity grades. The current viscosity ranges available are those from 70 to 325 centipoises at 20° C. for a 5 percent aqueous solution and 75 to 5,000 centipoises for a 2 percent aqueous solution at 20° C. All viscosity grades are suitable for the practice of our invention, and it is simply a matter of adding sufficient hydroxyethyl cellulose to secure the desired suspension (stiffness) properties in an emulsion composition formulated otherwise within the limits set forth above, or within the narrower preferred limits set forth hereinafter.

THE EMULSIFIER

In order to make an emulsion of the foregoing ingredients of the vehicle, we employ an emulsifier capable of forming the vehicle into an oil-in-water type of emulsion. Many kinds of surfactants are available commercially, exemplary ones being the fatty alkanolamides which are condensation products of the reaction between diethanolamine and various fatty acid materials (this particular group of wetting agents is identified by the trademark "Emcol" 5000 and 5100). We can employ small quantities of these and other emulsifiers, for example, from about 0.3 percent to 3.0 percent based on the weight of the vehicle, more preferably 0.5–3.0% of the Emcol types.

Other non-ionic emulsifiers can be used, however, since the function of the emulsifier is merely that of stably emulsifying the hydrocarbon component as the internal phase. Suitable emulsifiers for this purpose are the alkyl aryl sulfonates, polyoxyethylated fatty alcohols, polyoxyethylated hydroxy-acid glyceride oils and polyoxyethylated partial glyceryl/fatty acid esters. It is well-known that hydrocarbons can be emulsified to form oil-in-water emulsions by using a host of specifically different anionic and/or non-ionic emulsifiers, and we believe it is here unnecessary to elaborate on this common knowledge. For our purposes, however, we prefer to use only the non-ionic emulsifiers and particularly prefer the fatty alkanolamide reaction products described above.

At this point we want to explain that the foregoing ingredients in the indicated proportions yield an emulsion which exhibits gel properties. The hydroxyethyl cellulose is the ingredient which is primarily responsible for the gel characteristics, but we have discovered that it alone is inadequate to form a gelled phase having the characteristics we seek. The addition of the water-soluble alcohols and the emulsified hydrocarbon phase is necessary to develop the desired anti-spattering and anti-spreading qualities, and then only when these materials are included in proportions corresponding with the over-all formulation limits set forth above. We presently offer no explanation as to why the combination of water, water-soluble alcohol(s), hydroxyethyl cellulose, emulsifying agent and hydrocarbon component together yield a stable, oil-in-water type gelled emulsion exhibiting desired anti-spreading and anti-spattering properties, but our tests have established clearly that in order to secure these qualities plus the desired non-settling qualities, each of the essential ingredients must be present in the proportions indicated hereinabove.

PREPARATION OF THE GELLED EMULSION VEHICLE

We have found that hydroxyethyl cellulose is difficult to disperse so as to secure a finished product in which the material is utilized efficiently. That is, the hydroxyethyl cellulose tends to form lumps which are difficult to break up. To avoid such lumps (which represent unutilized material) we have found it desirable to first wet the hydroxyethyl cellulose with the water-soluble alcohol(s). This can be done easily by using a portion of the water-soluble alcohol(s) as a "heel" to which all the hydroxyethyl cellulose is added slowly with agitation while warming to about 120° F. Stirring the warm mixture for a few minutes (e.g. 15 minutes) forms a smooth dispersion. Then all the water of the formulation can be added slowly while continuing to heat the mass and while agitating it. After about half an hour, the resulting mass becomes clear and exhibits no undissolved hydroxyethyl cellulose. If the water is added rapidly, or all at once, lumping occurs. After a clear solution has been secured in the above manner, the balance of water-soluble alcohol can be added slowly and the mass cooled.

At this point one can either add the emulsifier or the hydrocarbon component, with stirring. Generally, it is convenient to add the emulsifier first and then add the hydrocarbon, thereby to secure a gelled emulsion vehicle to which joining metal components can be later added whenever desired. However, when stearic-acid coated copper powder is an ingredient of the joining-metal component, we have found that better stability can be secured by first adding the hydrocarbon component, stirring the whole mass to disperse the latter, then adding the joining-metal component with stirring, and finally adding the emulsifier.

It should be understood, however, that the above procedure is not a prerequisite to the sattisfactory practice of our invention, since the ingredients of the vehicle can be put together in any desired order, provided great care is used to avoid conditions which cause the hydroxyethyl cellulose to form lumps or to be precipitated partially or fully in any intermediate stage. Thus, the procedure described above is one which we have found to be thoroughly practical from the standpoint of convenience, expended time, and avoidance of inordinate care.

USE OF THE GELLED EMULSION VEHICLE

As noted above, the gelled vehicle has been developed primarily to provide a medium in which desired joining metal components can be stably suspended in a non-settling condition, thereby to make pastes which can be used for joining operations. At the same time, the vehicle has been developed through formulation so as to yield a paste having desired anti-spreading and anti-spattering qualities.

In our work with our gelled emulsion pastes, we have encountered some difficulty in reaching a formulation which could be said to be universally satisfactory. That is, some brazing furnace atmospheres are carefully controlled so as to contain very little moisture (e.g. they have dew points below 0° F.). In other instances, little or no attention is paid to the dew point of the atmosphere, and we occasionally find it necessary to formulate a paste which will perform satisfactorily in a furnace having an atmosphere whose dew point is as high as +40° F. Such a high dew point is inimical to the proper functioning of our pastes, since the pastes are formulated to lose their water smoothly to the furnace atmosphere.

A high dew point impedes this smooth loss of water with the result that a paste which is non-spreading and non-spattering in an atmosphere having a dew point of 0° F. or lower exhibits spreading and spattering when the dew point is as high as +40° F. On the contrary a paste designed to exhibit non-spreading and non-spattering properties at a dew point of +40° F. is not ordinarily one which is equally satisfactory at a dew point of −40° F., since the latter atmosphere encourages rapid loss of water from the paste, with resultant spattering. Thus, we presently offer no particular formulation as being a universal one, and instead recognize that one practicing the invention should tailor-make the paste to the atmosphere which the customer chooses to employ. Our overall formulation limits have been set on this basis, while the following examples serve as guides to specific formulations which are useful under diverse dew point and other use conditions. However, since most modern copper brazing furnaces are instrumented to control the dew point at 0° F. or lower, we find that the following restricted ranges of formulation yield pastes which perform very satisfactory in such furnaces. These formulations accordingly represent our presently preferred formulations.

| Ingredient | Preferred (weight percent) | Esp. preferred (weight percent) |
| --- | --- | --- |
| Water | 18–27 | 22.5–26.5 |
| Glycols (as defined above) | 76–58 | 63.4–67.5 |
| Caloria solutions (6–44%) | 5–10.5 | |
| Caloria 50 solution | | 7.9–8.4 |
| Hydroxyethyl cellulose | .5–3 | .8–1.1 |
| Emcols, esp. Emcol 5100 | .5–3 | 1.1–1.2 |
| Borax | Optional | Optional |
| KNO₃ | Optional | Optional |
| NaOH to a pH of at least 7.5 (preferably to a pH of 8–9) | Optional | Optional |

Our gelled emulsion vehicles and pastes, even when made with the fatty alkanolamides as emulsifiers (which are alkaline in reaction) are generally mildly acidic in pH. Where such mild acidity leads to corrosion of applicators, the work or other metal parts contacted by the pastes, the corrosion can be effectively retarded or even eliminated by adding caustic or other inorganic alkali so as to bring the vehicles and pastes to a stable alkaline pH of 7.5 or higher, preferably a pH between 8 and 9.

OTHER OPTIONAL INGREDIENTS OF THE PASTES

As indicated earlier herein, fluxes are an optional ingredient. For pastes to be used on ferrous metals, borax and boric acid mixtures are effective fluxes. Borax is also an effective flux for copper and copper-base parent metals, as where phos-copper alloy is the joining metal. A flux useful for a wide variety of parent metals, including aluminum, is that disclosed in Example 5 of U.S. Patent 2,908,072 (a zinc halide, tin halide, alkali halide mixture). However, satisfactory use of our pastes need not entail any flux whatever, or can entail the use of any of the many known fluxes which are adapted for the parent metal and joining metal(s) which one intends to employ in making a selected joint. We have found that the small amounts of diverse fluxes which are apt to be selected for joining work ordinarily do not cause any significant alteration in the non-settling, anti-spattering and anti-spreading qualities of our pastes.

Oxidizing agents, used as scavengers for carbon deposits, are also optional ingredients. However, they are not often needed when the hydrocarbon component of our vehicles is selected to have a Conradson residue of .1% or lower. Alkali metal nitrates are effective oxidizing agents, but other stable inorganic compounds such as chromates, persulfates, permanganates, peroxides, nitrates, etc. can be used.

Wetting agents, i.e. surfactants which assist the pastes in wetting oily parent metal, can be added provided they are non-ionic or anionic in nature. Cationic agents should be avoided since they can, in some instances, disrupt the emulsion of the vehicle.

Iron powder and/or iron oxide can be added for the functions ascribed to them in U.S. Patent 2,606,132.

All such optional additives are preferably introduced in the form of finely-divided solid particles to a finished joining metal paste, and can conveniently be added by a paste user when he encounters temporary conditions raising a need for one or more of the additives. In the same way, the paste user can adjust the pH of the paste to suit his conditions, by adding caustic or other alkaline materials in solid, powdery form, or in the form of nearly-saturated aqueous solutions.

Stearic acid can be added as a convenient means for depressing excessive amounts of fatty alkanolamide emulsifier. It is also useful for introducing small amounts of anionic fatty acid soap emulsifier to an already alkaline paste. Such soap can sometimes be helpful to improve the wetting of oily metal.

For convenience, the following tabulation is given to show the proportions of vehicle components when calculated on the basis of two finished joining metal pastes in which the vehicle is 15% of one, balance joining metal component, and is 30% in the other, balance joining metal component.

| Ingredient | Weight percent in vehicle only | Weight percent in finished paste | |
| --- | --- | --- | --- |
| | | Vehicle= 15% | Vehicle= 30% |
| Water | 14.8–45.0 | 2.20– 6.75 | 4–40–13.50 |
| Water soluble alcohol(s) | 79.2–45.0 | 6.75–11.88 | 13.50–24.76 |
| Hydrocarbon component | 5.0–17.7 | 0.75– 2.66 | 1.50– 5.31 |
| Hydroxyethyl cellulose | 0.5– 5.4 | 0.075– 0.81 | 0.15– 1.62 |
| Emulsifying agent | 0.3– 3.0 | 0.045– 0.45 | 0.09– 0.90 |
| Joining metal component | None | 15.0–15.0 | 30.0–30.0 |

Having thus outlined the general and specific nature of this invention, the following examples are offered to illustrate further recommended vehicle and paste formulations for the practice of this invention. In the examples, the emulsifying agent employed is the trademarked product "Emcol 5100." The hydroxyethyl cellulose employed in all of the exhamples (except Example 7 where "Cellosize" WP–09 is employed) is Cellosize WP–4400. However the amounts of Cellosize are indicated on a dry weight basis, as are all other ingredients except water.

Example 1 below demonstrates a vehicle of average composition for soldering and brazing pastes:

EXAMPLE 1

| | Percent |
| --- | --- |
| Ethylene glycol | 60.0 |
| Water | 20.8 |
| Caloria 40M | 2.1 |
| Caloria 50 | 15.6 |
| Emulsifying agent | 0.3 |
| Hydroxyethyl cellulose | 1.2 |

Copper pastes are formulated as follows using the vehicle ingredients of Example 1 and joining-metal components whose mesh sizes are indicated (e.g. 95%–325 mesh).

EXAMPLE 2

| | Percent |
|---|---|
| Ethylene glycol | 9.0 |
| Water | 3.4 |
| Caloria 40M | 0.3 |
| Caloria 50 | 1.8 |
| Emulsifying agent | 0.2 |
| Hydroxyethyl cellulose | 0.3 |
| Cuprous oxide powder | 42.4 |
| Copper powder (95% −325) | 42.4 |
| Borax | 0.1 |
| Boric acid | 0.1 |

EXAMPLE 3

| | |
|---|---|
| Ethylene glycol | 8.5 |
| Water | 2.8 |
| Caloria 40M | 0.6 |
| Caloria 50 | 1.2 |
| Emulsifying agent | 0.3 |
| Hydroxyethyl cellulose | 0.3 |
| Cuprous oxide powder | 70.4 |
| Copper powder (95% −325) | 11.4 |
| $Fe_2O_3$ | 4.3 |
| Borax | 0.1 |
| Boric acid | 0.1 |

EXAMPLE 4

| | |
|---|---|
| Ethylene glycol | 9.3 |
| Water | 3.4 |
| Caloria 40M | 1.3 |
| Caloria 50 | 0.7 |
| Emulsifying agent | 0.1 |
| Hydroxyethyl cellulose | 0.4 |
| Copper powder (5% +325; 95% −325) | 84.6 |
| Borax | 0.1 |
| Boric acid | 0.1 |

EXAMPLE 5

| | |
|---|---|
| Ethylene glycol | 10.7 |
| Water | 1.7 |
| Caloria 50 | 1.7 |
| Emulsifying agent | 0.2 |
| Hydroxyethyl cellulose | 0.2 |
| Cuprous oxide powder | 31.1 |
| 40 mesh copper powder (100% −40 +200) | 54.4 |

EXAMPLE 6

| | |
|---|---|
| Ethylene glycol | 10.0 |
| Water | 3.7 |
| Caloria 40M | 0.3 |
| Caloria 50 | 1.9 |
| Emulsifying agent | 0.3 |
| Hydroxyethyl cellulose | 0.2 |
| Cuprous oxide powder | 83.4 |
| Borax | 0.1 |
| Boric acid | 0.1 |

EXAMPLE 7

| | |
|---|---|
| Ethylene glycol | 9.2 |
| Water | 3.4 |
| Caloria 40M | 0.4 |
| Caloria 50 | 1.7 |
| Emulsifying agent | 0.3 |
| Hydroxyethyl cellulose | 0.9 |
| Cuprous oxide powder | 42.0 |
| Copper powder (95% −325) | 42.0 |
| Borax | 0.1 |
| Boric acid | 0.1 |

A copper-tin paste is formulated as follows using the vehicle ingredients of Example 1.

EXAMPLE 8

| | Percent |
|---|---|
| Ethylene glycol | 9.3 |
| Water | 3.4 |
| Caloria 40M | 1.3 |
| Caloria 50 | 0.8 |
| Emulsifying agent | 0.3 |
| Hydroxyethyl cellulose | 0.3 |
| Cuprous oxide powder | 76.0 |
| Tin powder (5%, +325; 95% −325) | 8.5 |
| NaOH | 0.1 |

Lead-tin pastes are formulated as follows using the vehicle ingredients of Example 1.

EXAMPLE 9

| | Percent |
|---|---|
| Ethylene glycol | 9.4 |
| Water | 3.4 |
| Caloria 40M | 0.3 |
| Caloria 50 | 2.5 |
| Emulsifying agent | 0.1 |
| Hydroxyethyl cellulose | 0.3 |
| Tin powder (95% −325) | 40.0 |
| 100-mesh lead powder (30% +150; 70% −150 +325) | 40.0 |
| Zinc ammonium chloride | 4.0 |

EXAMPLE 10

| | Percent |
|---|---|
| Ethylene glycol | 9.4 |
| Water | 3.4 |
| Caloria 40M | 0.3 |
| Caloria 50 | 2.5 |
| Emulsifying agent | 0.1 |
| Hydroxyethyl cellulose | 0.3 |
| Lead-tin alloy powder (50% −100 +325; 50% −325) | 80.0 |
| Zinc ammonium chloride | 4.0 |

A tin paste is formulated as follows using the vehicle ingredients of Example 1.

EXAMPLE 11

| | Percent |
|---|---|
| Ethylene glycol | 9.4 |
| Water | 3.4 |
| Caloria 40M | 0.3 |
| Caloria 50 | 2.5 |
| Emulsifying agent | 0.1 |
| Hydroxyethyl cellulose | 0.3 |
| Tin powder (95% −325) | 40.0 |
| 100-mesh tin powder (30% +150; 70% −150 +325 | 40.0 |
| Zinc ammonium chloride | 4.0 |

A phosphorus-copper paste is formulated as follows using the vehicle ingredients of Example 1.

EXAMPLE 12

| | Percent |
|---|---|
| Ethylene glycol | 9.4 |
| Water | 3.4 |
| Caloria 40M | 0.3 |
| Caloria 50 | 2.5 |
| Emulsifying agent | 0.1 |
| Hydroxyethyl cellulose | 0.3 |
| Copper powder (5% +325; 95% −325) | 40.0 |
| Phosphorus copper powder (100% −40 +200) | 40.0 |
| $KNO_3$ | 4.0 |

EXAMPLES 13–18

The following are specific furnace brazing paste formulations using Caloria 50 oil in amounts between 1.5% and 1.8%, using water between 4.2% and 6.1%, using ethylene glycol between 12.6% and 14.5%, using Emcol 5100 emulsifier in amounts between 0.15% and 0.25%, using Cellosize in amounts between 0.22% and 0.27%, using copper powder and cuprous oxide in various ratios to form the joining-metal component, and further illustrating the use or non-use of fluxes. The example formulations have been found to be wholly satisfactory in conventional copper brazing furnaces where the atmosphere is controlled to a dew point below 0° F. All figures represent weight percent.

| Ex. | Water | Ethylene glycol | Emcol | Cellosize | Caloria 50 oil | Cuprous oxide | Copper powder | Borax |
|---|---|---|---|---|---|---|---|---|
| 13 | 6.1 | 12.6 | 0.15 | 0.23 | 1.5 | 49.0 | 30.4 | .06 |
| 14 | 4.3 | 13.1 | 0.20 | 0.25 | 1.8 | 58.8 | 21.4 | .06 |
| 15 | 4.2 | 14.5 | 0.25 | 0.27 | 1.7 | 57.8 | 21.2 | .06 |
| 16 | 4.4 | 14.4 | 0.17 | 0.25 | 1.7 | 60.4 | 18.6 | None |
| 17 | 4.5 | 13.8 | 0.18 | 0.22 | 1.7 | 59.2 | 20.3 | .10 |
| 18 | 4.5 | 13.8 | 0.20 | 0.26 | 1.7 | 60.0 | 19.5 | None |

When the vehicles of the above examples are considered apart from the cuprous oxide, copper powder and borax, the proportions are as follow, on a weight percent basis:

| | Percent |
|---|---|
| Water | 22.5–26.5 |
| Ethylene glycol | 63.4–67.5 |
| Emcol | 1.17–1.18 |
| Cellosize | 0.8–1.1 |
| Caloria 50 oil | 7.9–8.05 |

EXAMPLES 19–21

These examples illustrate furnace brazing paste formulations having a range of ratios between ethylene glycol and water, with other minor variations. The pastes have been found in actual brazing tests in conventional copper brazing furnaces to be satisfactorily non-spreading and non-spattering, and to be non-drying in mechanical paste applicators. It will be understood that "non-drying" in the sense used here means that the pastes do not dry in the nozzle of an applicator when the applicator has not been used for an extended period of time (e.g. 12–16 hours) and also means that the pastes can be sprayed on the work without forming a dry, dust-like deposit on or around the work. The figures represent weight percent.

| Example | Water | Ethylene glycol | Caloria 50 oil | Emcol | Hydroxyethyl cellulose | Copper powder [1] |
|---|---|---|---|---|---|---|
| 19 | 5.35 | 16.39 | 2.03 | 0.44 | 0.23 | 75.56 |
| 20 | 3.69 | 16.39 | 3.69 | 0.29 | 0.23 | 75.71 |
| 21 | 10.87 | 10.87 | 2.03 | 0.29 | 0.23 | 75.71 |

[1] 95% −325 mesh.

When the vehicles themselves are computed (apart from the copper powder of the paste), the proportions are as follow in percent by weight:

| | Example 19 | Example 20 | Example 21 |
|---|---|---|---|
| Water | 21.84 | 15.15 | 44.74 |
| Ethylene glycol | 67.10 | 67.55 | 44.74 |
| Caloria 50 oil | 8.32 | 15.15 | 8.38 |
| Emcol | 1.80 | 1.19 | 1.19 |
| Hydroxyethyl cellulose | .94 | 0.95 | 0.95 |
| | 100.00 | 99.99 | 100.00 |

EXAMPLES 22–27

These examples illustrate diverse joining-paste formulations encompassed within the disclosures set forth hereinabove. The figures represent weight percent.

| Ingredient | Ex. 22 | Ex. 23 | Ex. 24 | Ex. 25 | Ex. 26 | Ex. 27 |
|---|---|---|---|---|---|---|
| Water | 4.9 | 4.3 | 5.5 | 4.5 | 4.0 | 4.6 |
| Ethylene glycol | 13.20 | 11.08 | 19.53 | 14.60 | | 12.20 |
| Isopropyl alcohol | 5.70 | | | | | |
| Glycerine | | | | | 9.37 | |
| Caloria 40M solution | | | | | 2.0 | 1.9 |
| Gasoline | | | 2.5 | | | |
| Kerosene | 2.6 | | | | | |
| Synthetic hydrocarbon oil [1] | | 1.60 | | 1.80 | | |
| Hydroxyethyl cellulose | 0.19 | 0.18 | 0.20 | 0.17 | 0.21 | 0.20 |
| Emcol 5100 | | 0.24 | | | | |
| Alkyl aryl sulfonate [2] | | | 0.17 | | | |
| Emulphor El-620 [3] | | | | | 0.22 | |
| Nonic 218 [4] | 0.21 | | | 0.23 | | 0.20 |
| Silver powder [5] | | | | | 12.3 | |
| 85% Cu, 15% Phos powder [6] | | | | | 26.7 | |
| Copper powder [7] | | 52.8 | | | 43.0 | 76.5 |
| Cuprous oxide [8] | 73.0 | 29.2 | 72.0 | 78.5 | | |
| $Fe_2O_3$ [9] | | | | | | 4.0 |
| Stearic acid | | 0.20 | | | 0.20 | 0.20 |
| $KNO_3$ | | 0.20 | | | 2.0 | |
| Borax | 0.10 | 0.10 | | 0.10 | | 0.10 |
| Boric acid | | | | | 0.10 | |
| NaOH | 0.10 | 0.10 | 0.10 | | | 0.10 |

[1] The petrolatum/synthetic polymeric heat-depolymerizable hydrocarbon oil solution of the "Example" of U.S. Patent 2,566,339.
[2] Santomerse No. 1, dodecylbenzene sulfonate.
[3] Polyethylene ether (average of 6 ethylene oxide groups) of a 20 carbon fatty alcohol. For other hydrocarbon emulsifiers equally effective for our purposes see "Handbook of Material Trade Names" by Zimmerman and Levine, 1960, Supp. III under Emulphor VN 430 and ON 870 (e.g. polyethylene ethers of fatty acids such as ricinoleic, or of castor oil).
[4] A tertiary dodecyl thioether of polyoxyethylene glycol ethanol; U.S. Patent 2,565,986.
[5] 95%—325 mesh.
[6] 100%—40 mesh +200 mesh.
[7] 95%—325 mesh.
[8] 99%—325 mesh.
[9] 99%—325 mesh.

Example 24 is a typical formulation appropriate for use in a copper brazing furnace whose atmosphere has a dew point of +40° F. The octane gasoline vaporizes rapidly at low heat to prevent spattering and spreading. The fine particle size in the joining metal component (averaging below about 4 microns) also assists in securing these results. Even finer particle size (0.1–1.0 micron) would improve the assistance. It will be understood that an atmosphere whose dew point is +40° F. is exothermic in its effect, thereby burning out carbon; hence oxidizing agent is not needed.

Example 23 is a typical formulation appropriate for use in an atmosphere whose dew point is between 0° F. and 40° F. Such an atmosphere is endothermic, hence an oxidizing agent is beneficial.

EXAMPLE 28

This illustrates a typical formulation appropriate for use in a furnace whose atmosphere has a dew point below 0° F. e.g. a dissociated ammonia atmosphere whose dew point can be readily controlled to a point as low as −60° F. Because such an atmosphere is highly endothermic it is beneficial to choose a hydrocarbon component whose Conradson residue value is as low as possible (e.g. Carloria 40 M solution). An oxidizing agent is needed to burn out residual carbon even then.

| | Paste (weight percent) | Vehicle only (weight percent) |
|---|---|---|
| Water | 4.5 | 23.4 |
| Ethylene glycol | 12.3 | 64.24 |
| Caloria 40M solution | 2.0 | 10.3 |
| Emcol 5100 | 0.20 | 1.03 |
| Hydroxyethyl cellulose | 0.20 | 1.03 |
| Copper powder (95%–325 mesh) | 80.5 | |
| Potassium nitrate | 0.15 | |
| Sodium hydroxide | 0.15 | |
| | 100.00 | 100.00 |

Pastes formulated in accordance with the examples offered above do not spread when heated, and have an indefinite shelf life. The pastes are non-drying when exposed to air and have good lubricating qualities derived from the high glycol content. This latter quality also enables one to apply these pastes easily by mechanical means.

Although the particle size of the powders used herein are adequately described in the art made of reference above, it should be mentioned here that for the copper powders (including the oxides or a combination) a particle size of essentially —325 mesh is suitable. In general, however, the copper powders can be about 20 mesh or finer. Whether a copper powder is employed in brazing pastes or a phosphorus-copper alloy or mixture, lead-tin alloy or mixture, brass, phosphorus-copper-silver alloy or mixture, etc., the metallic component should be finely divided in order to be adequately suspended in the paste composition as is well known to those skilled in this art. Resort can be had to the literature for further consideration of this known aspect of this invention.

From the above description of our invention and the examples offered as illustrations thereof, we have thus provided an improved brazing paste composition comprising a vehicle consisting of a water-soluble alcohol, water in amounts smaller than or equalling the alcohol component, a low Conradson carbon value liquid hydrocarbon component in small amounts, hydroxyethyl cellulose, and an amount of emulsifying agent sufficient to effect an emulsion of the components herein named.

The vehicles described above are admirably suited for conventional copper brazing paste formulations as well as for phosphorous-copper pastes, lead-tin alloy powders, pastes, etc., as heretofore described. Minor ingredients which can be incorporated into these pastes when required are fluxes (borax, boric acid, etc.) a few percent of oxidizing agent to burn out residual carbon if any, and alkaline material giving the paste a pH of at least 7.5, all such minor additives being conventional in the art of metal joining where paste-type joining metal compositions are employed.

Having described our invention what we claim is:

1. A gel-type emulsion composition adapted for use as a vehicle for joining metal pastes and consisting essentially of an oil-in-water emulsion gel having a gelled aqueous phase as the continuous phase and having a liquid hydrocarbon component as the emulsified discontinuous phase, said composition consisting essentially of: (A) water in an amount between about 14.8% and 45% by weight; (B) a water soluble alcohol component having a plasticizing effect on hydroxyethyl cellulose, in an amount between about 45% and 79.2% by weight; (C) hydroxyethyl cellulose in an amount between about 0.5% and 5.4%, by weight; (D) a normally-liquid hydrocarbon component having a Conradson residue value below about 0.5%, in an amount between about 5.0% and 17.7%, by weight; and (E) an emulsifier component effective to emulsify said hydrocarbon component as a discontinuous phase in the aqueous phase of said composition, said emulsifier component amounting to between about 0.3% and 3.0%, by weight; said emulsifier component of E above being selected from the group consisting of alkyl aryl sulfonates, polyoxyethylated fatty alcohols, polyoxyethylated hydroxy-acid glyceride oils, polyoxyethylated partial glyceryl/fatty acid esters, and fatty acid/diethanolamine condensation products, said water soluble alcohol of B above being selected from the group consisting of hydrocarbyl polyols of 3–6 carbon atoms and 3–6 hydroxyl groups, alkylene glycols of 2–8 carbon atoms, polyoxyalkylene glycols of 4–8 carbon atoms, ethanol amines of 2–6 carbon atoms and 1 to 3 hydroxyl groups, and mixtures of the foregoing with up to about 30% by weight of branched chain alkanols of 3–6 carbon atoms; and said normally-liquid hydrocarbon component of D above being selected from the group consisting of normally-liquid hydrocarbons and normally-liquid hydrocarbon-solvent solutions of heat-depolymerizable polymeric hydrocarbon gels.

2. An emulsion composition as claimed in claim 1 wherein the water-soluble alcohol component consists essentially of said glycols, and wherein the emulsifying agent is a condensation product of diethanolamine and fatty acid.

3. An emulsion composition as claimed in claim 2 wherein the proportions of the respective ingredients are as follow:

| | Weight percent |
|---|---|
| Water | 18.0–27.0 |
| Water-soluble glycol of 2–8 carbons | 76.0–58.0 |
| Hydroxyethyl cellulose | 0.5–58.0 |
| Diethanolamine/fatty acid emulsifier | 0.5–3.0 |
| 6–44% solutions of polybutene in hydrocarbon oil | 5.0–10.5 |

4. An emulsion composition as claimed in claim 3 wherein said solutions of polybutene in hydrocarbon oil have Conradson residue values no greater than 0.1%.

5. An emulsion composition as claimed in claim 3 wherein the proportions of the respective ingredients are as follow:

| | Weight percent |
|---|---|
| Water | 22.5–26.5 |
| Water-soluble glycol | 63.4–67.5 |
| Hydroxyethyl cellulose | 0.8–1.1 |
| Diethanolamine/fatty acid emulsifier | 1.1–1.8 |
| 6–44% solutions of polybutene in hydrocarbon oil | 7.9–8.4 |

6. An emulsion composition as claimed in claim 5 wherein the water-soluble glycol is ethylene glycol, wherein the polybutene solution is a 6% solution of polybutene in volatile light petroleum oil, the solution having a viscosity of about A on the Gardner-Holdt scale at 25° C., and wherein said solution of polybutene in petroleum oil has a Conradson residue value no greater than 0.1%.

7. An improved joining paste consisting essentially of about 15–30% by weight of an emulsion vehicle as claimed in claim 1, and about 70–85% by weight of a powdery metal-yielding joining component dispersed therein, said metal-yielding component being selected from the group consisting of bonding metals, alloys, their oxides, and mixtures thereof.

8. A paste as claimed in claim 7 which includes a small amount of at least one optional additive selected from the group consisting of fluxes, inorganic oxidizing agents, and inorganic alkaline compounds capable of alkalizing the paste to a pH of at least 7.5.

9. An improved joining paste consisting essentially of about 15–30% by weight of an emulsion vehicle as claimed in claim 2, and about 70–85% by weight of a powdery metal-yielding joining component dispersed therein, said metal-yielding component being selected from the group consisting of bonding metals, alloys, their oxides, and mixtures thereof.

10. A paste as claimed in claim 9 which includes a small amount of at least one optional additive selected from the group consisting of fluxes, inorganic oxidizing agents, and inorganic alkaline compounds capable of alkalizing the paste to a pH of at least 7.5.

11. An improved joining paste consisting essentially of about 15–30% by weight of an emulsion vehicle as claimed in claim 3, and about 70–85% by weight of a powdery metal-yielding joining component dispersed therein, said metal-yielding component being selected from the group consisting of bonding metals, alloys, their oxides, and mixtures thereof.

12. A paste as claimed in claim 11 which includes a small amount of at least one optional additive selected from the group consisting of fluxes, inorganic oxidizing agents, and inorganic alkaline compounds capable of alkalizing the paste to a pH of at least 7.5.

13. An improved joining paste consisting essentially of about 15–30% by weight of an emulsion vehicle as claimed in claim 4, and about 70–85% by weight of a powdery metal-yielding joining component dispersed therein, said metal-yielding component being selected from the group consisting of bonding metals, alloys, their oxides, and mixtures thereof.

14. A paste as claimed in claim 13 which includes a small amount of at least one optional additive selected from the group consisting of fluxes, inorganic oxidizing agents, and inorganic alkaline compounds capable of alkalizing the paste to a pH of at least 7.5.

15. A paste as claimed in claim 14 wherein the powdery joining metal component has an average particle size below about 4 microns.

16. An improved joining paste consisting essentially of about 15–30% by weight of an emulsion vehicle as claimed in claim 5, and about 70–85% by weight of a powdery metal-yielding joining component dispersed therein, said metal-yielding component being selected from the group consisting of bonding metals, alloys, their oxides, and mixtures thereof.

17. A paste as claimed in claim 16 which includes a small amount of at least one optional additive selected from the group consisting of fluxes, inorganic oxidizing agents, and inorganic alkaline compounds capable of alkalizing the paste to a pH of at least 7.5.

18. An improved joining paste consisting essentially of about 15–30% by weight of an emulsion vehicle as claimed in claim 6, and about 70–85% by weight of a powdery metal-yielding joining component dispersed therein, said metal-yielding component being selected from the group consisting of bonding metals, alloys, their oxides, and mixtures thereof.

19. A paste as claimed in claim 18 which includes a small amount of at least one optional additive selected from the group consisting of fluxes, inorganic oxidizing agents, and inorganic alkaline compounds capable of alkalizing the paste to a pH of at least 7.5.

20. A paste as claimed in claim 19 wherein the paste contains added inorganic alkaline compound and has a pH between about 8.5 and 9.

References Cited in the file of this patent

UNITED STATES PATENTS

| | | |
|---|---|---|
| 2,606,132 | Klinker | Aug. 5, 1952 |
| 2,759,446 | Ewing | Aug. 21, 1956 |
| 2,908,072 | Johnson | Oct. 13, 1959 |